United States Patent [19]

Frey

[11] Patent Number: 5,512,257

[45] Date of Patent: Apr. 30, 1996

[54] PROCESS FOR THE TREATMENT OF FLUE PARTICULATES

[75] Inventor: Rudolf Frey, Effretikon, Switzerland

[73] Assignee: Von Roll Umwelttechnik AG, Zurich, Switzerland

[21] Appl. No.: 449,845

[22] Filed: May 24, 1995

Related U.S. Application Data

[63] Continuation of Ser. No. 144,615, Nov. 1, 1993, abandoned, which is a continuation of Ser. No. 793,952, Oct. 22, 1991, abandoned.

[30] Foreign Application Priority Data

Oct. 22, 1990 [CH] Switzerland .......................... 03359/90

[51] Int. Cl.$^6$ ........................................ C22B 7/02
[52] U.S. Cl. ..................... 423/98; 423/109; 106/DIG. 1; 588/236; 210/912
[58] Field of Search ............... 423/92, 104, DIG. 18, 423/DIG. 20, 98, 109; 588/231, 236; 106/DIG. 1; 210/912

[56] References Cited

U.S. PATENT DOCUMENTS

| | | | |
|---|---|---|---|
| 3,953,306 | 4/1976 | Lancy | 204/106 |
| 4,193,854 | 3/1980 | Drnevich et al. | 204/149 |
| 4,222,769 | 9/1980 | Okuda et al. | 75/120 |
| 4,338,200 | 7/1982 | Zeijlstra | 210/724 |
| 4,342,732 | 8/1982 | Smith | 423/242 |
| 4,354,942 | 10/1982 | Kaczur et al. | 210/712 |
| 4,617,180 | 10/1986 | Vogg | 423/240 |
| 4,911,757 | 3/1990 | Lynn et al. | 106/85 |
| 5,041,398 | 8/1991 | Kauser | 501/27 |
| 5,045,115 | 9/1991 | Gmunder et al. | 106/709 |
| 5,173,286 | 12/1992 | Audeh | 423/566.1 |

FOREIGN PATENT DOCUMENTS

| | | | |
|---|---|---|---|
| 0244910 | 11/1987 | European Pat. Off. | |
| 0304412 | 2/1989 | European Pat. Off. | 423/240 |
| 0324454 | 7/1989 | European Pat. Off. | |
| 0362125 | 4/1990 | European Pat. Off. | |
| 3320466 | 12/1984 | Germany | 423/240 |
| 53-2381 | 1/1978 | Japan . | |
| 54-7778 | 1/1979 | Japan . | |
| 7304233 | 10/1973 | Netherlands | 210/912 |

OTHER PUBLICATIONS

Patent Abstracts of Japan, vol. 6, No. 180 (C–125) (1058), Sep. 14, 1982 & JP-A-57-94383, Jun. 11, 1982, T. Kuwabara, et al., "Treatment of Incineration Ash".

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

Fly ash from incineration plants is treated with an acidic aqueous solution for the purpose of removing heavy metals. The residual solid matter is filtered. The filtration residue is treated with a precipitating agent for heavy metals. The thereby obtained inert residue can be directly dumped.

17 Claims, No Drawings

PROCESS FOR THE TREATMENT OF FLUE PARTICULATES

This application is a continuation of application Ser. No. 08/144,615, filed on Nov. 1, 1993, now abandoned; which is a continuation of U.S. Ser. No. 07/793,952, filed Oct. 22, 1991, abandoned.

BACKGROUND OF THE INVENTION

The present invention broadly relates to a process for treating or purifying flue gases or fly ash and, more specifically, pertains to a new and improved process for the removal of heavy metals from the fly ash from an incineration plant, especially a waste incinerator.

Generally speaking, the process of the present invention is of the type according to which the resulting fly ash is subjected to treatment with an acidic aqueous solution and the liquid is separated from the residual solid matter by filtration.

Flue particulates come as a result in heating installations and incineration plants and are removed from the flue gases by means of fabric-base filters or electrostatic filters. These flue particulates, particularly in waste incinerators, contain heavy metals. The presence of soluble heavy-metal salts prohibits direct dumping of the flue particulates.

A process of the aforementioned type is known, for example, from German Patent No. 3,320,466, published Dec. 13, 1984 and its cognate U.S. Pat. No. 4,617,180, granted Oct. 14, 1986. According to the process disclosed therein for purifying flue gases developed during combustion of waste materials, the heavy metals are removed from the flue particulates by treatment with the acidic aqueous solution resulting in the flue-gas washing or scrubbing process. The washing condensate from such washing process is combined with the flue ash to partially dissolve the heavy metals and extract them from the flue ash. Following solid-liquid separation, the acidic aqueous solution, essentially composed of the washing condensate and the dissolved heavy metals, is subjected to heavy metal precipitation. The residue remaining subsequent to the acidic extraction still contains soluble metal compounds and therefore cannot be directly dumped. Accordingly, the residue must be either previously bound within a matrix, e.g. cement or bitumen, or returned to the combustion system in order to bind it into the slag during the incineration process.

The binding or retention in a matrix does not prove satisfactory for various reasons. According to environmental conditions, cement is sooner or later hydrolyzed, whereby the metal salts are set free. Water is entrained while returning or recycling the filtration residue to the combustion furnace. This adversely affects the energy balance.

SUMMARY OF THE INVENTION

Therefore, with the foregoing in mind, it is a primary object of the present invention to provide a new and improved process for treating flue particulates and thereby removing heavy metals from the fly ash of an incineration plant, and which is not afflicted with the drawbacks and limitations of prior art processes.

Another and more specific object of the present invention aims at providing a new and improved process for the treatment of flue particulates and by means of which the direct dumping of the treated product is rendered possible.

Now in order to implement these and still other objects of the present invention, which will become more readily apparent as the description proceeds, the process of the present development is manifested, among other things, by the step of treating the filtration residue with an aqueous solution of a precipitant or precipitating agent for heavy metals.

By means of the process according to the invention the soluble heavy-metal salts, which have not yet been removed after the acidic washing or extraction, are converted to an insoluble form.

Subsequent to the treatment with the precipitant or precipitating agent, the filtration residue, which practically no longer contains any soluble heavy metals and can be directly dumped, can be washed with some water for the purpose of removing the precipitant or precipitating agent.

The filtrate and the liquids from the treatment of the filtration residue can be brought together. The heavy metals are precipitated from this aggregate or combined liquid. The resulting sludge is upgraded and conducted to metal recovery. Bringing together these liquids enables using in excess the precipitation agent during the treatment of the filtration residue, since non-spent precipitants are automatically spent while precipitating the heavy metals.

According to another variant of the inventive process, the washing water of the filtration residue can be conducted to the flue-gas scrubber.

The choice of the precipitant or precipitating agent for the treatment of the filtration residue depends on the type of the burned or incinerated material and is also determined by economic considerations. Examples of suitable precipitants are caustic alkalis or earthy base hydroxides, for instance calcium hydroxide $Ca(OH)_2$, and inorganic as well as organic sulfides.

It is advantageous to add a soluble alkaline-earth compound, preferably a barium compound, to the mixture of fly ash and acidic washing water. In this manner, sulfates present in excess in the flue-gas washing liquid are precipitated. This contributes, on the one hand, to the inerting of the fly ash to be dumped or disposed and, on the other hand, to the reduction of the quantity of the dissolved solids present during heavy-metal precipitation as well as of the quantity of the resulting sludge. The latter leads to a more economical process in the following recovery of the heavy metals.

The removal of ammonia or ammonium salts from the fly ash can be effected by heating prior to carrying out the acidic scrubbing. On the other hand, removal of ammonia or ammonium salts from the neutralized washing liquid, i.e. the filtrate, can be effected by stripping.

DETAILED DESCRIPTION OF THE INVENTION

The process and the inventive steps thereof are now illustrated with the aid of the following example, which is included for illustration purposes only and is not necessarily meant to limit the invention.

EXAMPLE

On an average, the following materials result from incinerating or burning one ton of waste or garbage:

approximately 300 kg sludge,
approximately 25 kg fly ash, and approximately 112 kg acidic washing water from the wet flue-gas purification, containing 4.5 kg hydrogen chloride (HCl) and 3.0 kg sodium sulfate ($Na_2SO_4$).

To begin with, mercury is removed from the acidic washing water or liquid by means of an ion exchanger resin. The 25 kg fly ash are treated with the 112 kg of acidic washing water during 30 minutes and at a pH of 3 in a vessel or boiler provided with an agitator or agitating machine. Mobile and mobilizable heavy metals are thereby dissolved. The obtained suspension is given or conducted to a vacuum belt filter. The fly ash freed from the heavy metals and remaining on the filter as inert residue is washed first with a solution containing 0.5 to 2.0 g/l TMT 15 and 0.5 to 2.0 g/l $Ca(OH)_2$ and then washed with water, TMT 15 being a 15 percent solution of the precipitant trimercapto-S-triazine ($C_3H_3N_3S_3$). There is thereby used a total amount of 3 liters liquid per 1 liter fly ash, 1 kg fly ash corresponding to approximately 2 liters.

The heavy metals are precipitated from the united or combined liquids, i.e. filtrate and washing liquids, in that 3400 g of $Ca(OH)_2$ (dry) are added in water. The resulting sludge is dewatered in a filter press. The filter cake, which is designated as the heavy-metal concentrate, is then conducted to the metal-recovery process.

The following Table I shows a material balance of the process. The indications of weight indicate the quantity of dry substance. All indications of percentage refer to the dry-substance quantity which is brought in with the fly ash and the acidic washing water from the wet or wet-chemical flue-gas purification, such dry-substance quantity representing 100%.

TABLE I

|  | in g | inert residue | | heavy-metal concentrate | | total waste water | |
| --- | --- | --- | --- | --- | --- | --- | --- |
|  | (= 100%) | in g | in % | in g | in % | in g | in % |
| dry substance | 30500 | 16200 | 53.1 | 1700 | 5.6 | 16000 | 41.3 (*) |
| Cl | 6300 | <10 | <0.15 | 17 | 0.26 | 15973 | 99.6 |
| $SO_4$ | 2800 | 2500 | 89.3 | 50 | 1.8 | 250 | 8.9 |
| Zn | 1070 | 380 | 35.5 | 690 | 64.5 | <0.5 | <0.05 |
| Pb | 356 | 286 | 80.3 | 70 | 19.7 | <0.1 | <0.03 |
| Cd | 14.4 | 1.6 | 11.1 | 12.8 | 88.9 | <0.01 | <0.05 |
| Hg | 1.42 | 0.09 | 6.3 | 0.03 | 2.1 | <.001 | <0.07(**) |

(*) 3400 g of $CA(OH)_2$ (computed as dry substance) are added during precipitation of the heavy metals.
(**) 91.6% of mercury are removed by the Hg-preprecipitation.

The extraction or precipitation yields with respect to the starting material 'fly ash' are thus as follows:

dry substance: 35%, cadmium (Cd): 89%, zinc (Zn): 65% and lead (Pb): 20%.

The composition of the fly ash designated as inert residue and freed from heavy metals is listed in the following Table II.

TABLE II

| Material | Total Content g/kg | Content according to the TVA eluate test(*) mg/l |
| --- | --- | --- |
| Cl | 0.69 | |
| $SO_4$ | 173.0 | |
| Zn | 11.60 | 3.85 |
| Pb | 8.40 | 0.24 |

TABLE II-continued

| Material | Total Content g/kg | Content according to the TVA eluate test(*) mg/l |
| --- | --- | --- |
| Cd | 0.05 | 0.08 |
| Hg | 0.008 | <0.001 |

(*) The TVA eluate test (Technische Verordnung für Abfälle, i.e. 'Technical Regulations regarding Waste', issued by the Swiss Federal Ministry of the Interior) is a standardized process for determining whether waste acceptance requirements for direct dumping are met or not. The values obtained by virtue of the inventive process for treating flue particulates are below the limiting values specified in the fourth appendix (Anhang 4) of the TVA. In other words, fly ash treated according to the inventive process is suitable for direct dumping.

The composition of the filter cake, which was obtained by precipitation of the heavy metals from the waste water, i.e. filtrate and washing water, is listed in the following Table III.

TABLE III

| Material | Content in g/kg |
| --- | --- |
| Cl | 4.9 |
| $SO_4$ | 27.0 |
| Zn | 290.0 |
| Pb | 44.0 |
| Cd | 6.0 |
| Hg | <0.01 |

This filter cake is conducted to the metal recovery process.

While there is shown and described the present preferred example of the inventive process, it is to be understood that the invention is not limited thereto, but may be otherwise variously practiced within the scope of the following claims. ACCORDINGLY,

What I claim is:

1. A process for the treatment of fly ash from an incineration plant to obtain a fly ash substantially free of soluble heavy metal components, comprising the steps of:

treating the separated fly ash with an acidic aqueous solution to obtain a liquid of about pH 3 containing at least one dissolvable heavy metal component selected from the group consisting of zinc, cadmium, mercury and lead present in the fly ash and residual solid matter containing unextracted soluble heavy metal components, the acidic aqueous solution being washing liquid from a flue-gas scrubber of the incineration plant containing hydrogen chloride and sodium sulfate;

separating the liquid from the residual solid matter by filtration to obtain a cake of filtration residue containing unextracted dissolvable heavy metal components;

washing said cake of filtration residue with an aqueous solution of a precipitating agent for heavy metals, thereby binding said dissolvable heavy metals remaining in the filtration residue within said cake of filtration residue in an insoluble form, and recovering said cake of filtration residue containing the heavy metals present in an insoluble form.

2. The process as defined in claim 1, wherein:

the precipitating agent is a caustic alkali.

3. The process as defined in claim 1, wherein:

the precipitating agent is an alkaline-earth hydroxide.

4. The process as defined in claim 1, wherein:

the precipitating agent is calcium hydroxide.

5. The process as defined in claim 1, wherein:

the precipitating agent is a sulfide.

6. The process as defined in claim 1, wherein:

the precipitating agent is an organic sulfide.

7. The process as defined in claim 1, further including the step of:

washing the filtration residue with water subsequent to adding the precipitating agent.

8. The process as defined in claim 7, further including the step of:

conducting the washing water to the flue-gas scrubber.

9. The process as defined in claim 7, further including the step of:

adding the washing water to the mother liquor of the filtering operation.

10. The process as defined in claim 7, wherein said binding is conducted by treating said cake with an excess of precipitating agent solution, separating the cake from the used precipitating solution; and further including the steps of combining the acidic aqueous solution filtered off from the fly ash and the used precipitating agent solution; and the washing water; and treating the total liquid with a precipitating agent for heavy metals.

11. The process as defined in claim 2, further including the step of:

washing the filtration residue with an aqueous solution subsequent to the addition of the precipitating agent.

12. The process as defined in claim 11, further including the step of:

conducting the washing aqueous solution to the flue-gas scrubber.

13. The process as defined in claim 11, further including the step of:

adding the washing aqueous solution to the mother liquor of the filtering operation.

14. The process as defined in claim 11, wherein said binding is conducted by treating said cake with an excess of precipitating agent solution, separating the cake from the used precipitating solution; and further including the steps of combining the acidic aqueous solution filtered off from the fly ash and the used precipitating agent solution; and the washing aqueous solution; and treating the total liquid with a precipitating agent for heavy metals.

15. The process as defined in claim 2, further including the step of:

adding soluble alkaline earth metal compounds during said step of treating the fly ash with an acidic aqueous solution.

16. The process as defined in claim 15, wherein:

the soluble alkaline earth metal compounds are soluble barium compounds.

17. The process as defined in claim 2, wherein said binding is conducted by treating said cake with an excess of precipitating agent solution, separating the cake from the used precipitating solution; and further including the steps of combining the acidic aqueous solution filtered off from the fly ash and the used precipitating agent solution; and treating the total liquid with a precipitating agent for heavy metals.

* * * * *